United States Patent
Bretschneider et al.

(10) Patent No.: US 6,354,728 B1
(45) Date of Patent: Mar. 12, 2002

(54) DEVICE FOR PRODUCING A POURABLE PRODUCT WITH A GUIDE VANE THEREIN

(75) Inventors: Frank Bretschneider, Liegau-Augustusbad; Bruno Peter, Einbeck; Jürgen Bruckner, Dresden, all of (DE)

(73) Assignees: Glatt Systemtechnik Dresden GmbH, Dresden; Kws Saat AG, Einbeck, both of (DE)

( * ) Notice: Subject to any disclaimer, the term of this patent is extended or adjusted under 35 U.S.C. 154(b) by 0 days.

(21) Appl. No.: 09/555,095
(22) PCT Filed: Sep. 22, 1999
(86) PCT No.: PCT/DE99/03093
§ 371 Date: May 24, 2000
§ 102(e) Date: May 24, 2000
(87) PCT Pub. No.: WO00/16886
PCT Pub. Date: Mar. 30, 2000
(51) Int. Cl.$^7$ ................................................ B01F 7/16
(52) U.S. Cl. ...................... 366/286; 366/305; 366/307; 366/314
(58) Field of Search ................................. 366/314, 342, 366/225, 230, 231, 232, 286, 101, 105, 305, 307; 34/179, 181, 58, 59

(56) References Cited

U.S. PATENT DOCUMENTS

| | | | |
|---|---|---|---|
| 3,671,296 A | 6/1972 | Funakoshi et al. | |
| 3,782,643 A | 1/1974 | Carpenter, Jr. | 241/60 |
| 4,504,020 A | 3/1985 | Nishida et al. | |
| 4,724,794 A | 2/1988 | Itoh | |
| 4,826,325 A | 5/1989 | Iwata et al. | 366/221 |
| 5,296,265 A | 3/1994 | Okuma et al. | |
| 5,582,644 A * | 12/1996 | Gaddis et al. | |
| 5,902,042 A * | 5/1999 | Imaizumi et al. | |
| 6,217,206 B1 * | 4/2001 | Kirjavainen et al. | |
| 6,237,244 B1 | 5/2001 | Bryan et al. | |

FOREIGN PATENT DOCUMENTS

DE 4411058 4/1997

* cited by examiner

Primary Examiner—Charles E. Cooley
(74) Attorney, Agent, or Firm—Jacobson Holman, PLLC

(57) ABSTRACT

Device for producing a pourable product with a guide vane therein and method for using the device. The device includes a rotor chamber in which a rotor is arranged with a vertical rotor axis. The rotor has, at least in its radially outer third, the shape of a conical shell. Guide vanes for circulating starting materials or the product are arranged statically on an inner wall of the rotor chamber above the plane of the upper edge of the rotor. The guide vanes have, in cross section to the rotor axis, essentially the shape of a segment of a circle or spiral. The inner ends of the guide vanes lie approximately in the middle part of the rotor radius. The conical shell may have at least partially sheet-like gas passages in the form of perforations or screens. The device is used for producing pourable products.

15 Claims, 2 Drawing Sheets

DEVICE FOR PRODUCING A POURABLE PRODUCT WITH A GUIDE VANE THEREIN

CROSS-REFERENCE TO RELATED APPLICATIONS

This application is related to pending U.S. application Ser. No. 09/554,102, having the same inventors and same filing date as the present application.

BACKGROUND OF THE INVENTION

1. Field of the Invention

The invention relates to a device for producing a pourable product, in particular a pourable product with a coating. The device includes a guide vane. The invention further relates to various methods for using the device.

A pourable product is understood to be the finished product in the respective application of the invention. In this case, the pourable product may be composed basically of the same or different starting materials with a radially homogeneous or layered structure.

The pourable product may be of any kind, insofar as it is possible to put both this and the respective starting materials into radially peripheral circulation.

2. Description of Related Art

According to the prior art, various methods and devices for the granulation of starting materials or the coating of cores are known.

DE 41 28 258 A1 specifies a method for the uniform closed coating of grains, such as seed grains, by means of a rotor granulator with integrated fluidized-bed drying and a device for carrying it out. According to the method, the batch circulated by the running rotor and containing the dissolved or suspended coating materials is sprayed through one or more nozzles arranged in the free inner space of the stator and assisted by compressed air, warm air being introduced through the annular gap between the rotor and stator into the space containing the circulated batch. The associated device specifies a rotor, the cross section of which decreases from the center at an angle of up to 45° to the plane and is curved upward at the outer circumference, with a radius of about 10 to 20% of its diameter, to an edge angle of 45°. Located above the rotor in the stator, the deflecting funnel, is a thin-walled rotationally symmetric annular screen surface or annular gap surface which is surrounded on the outside by an air duct.

DE 4411058 C2 specifies a device for the coating of granular material, in particular for the coating of seed with chemicals, such as dressing agents. The device has a conically upwardly widened side wall of a mixing cylinder which rotates at high speed and which is rotatable about a vertical axis. The liquid chemicals are sprayed via a spraying means onto the granular material located in the mixing cylinder. For better intermixing of the granular material in the mixing chamber, bent diverting blades are arranged above the mixing cylinder on a discharge ring, said diverting blades deflecting the material and leading it back downward into the conical mixing cylinder.

The solutions according to the prior art often have relatively low productivity or can be used only to a limited extent for coatings. For example, the diverting blades engage into the material, and delicate products or their coatings, for example in the form of a pasty enveloping layer, are destroyed.

SUMMARY OF THE INVENTION

The object on which the invention is based is to specify a device for producing a pourable product, in particular a pourable product with a delicate structure or coating, of the type initially mentioned, which ensures high quality and productivity at a relatively low technical outlay. The invention relates, furthermore, to two methods for using the device.

Starting materials within the meaning of the invention are to be understood basically as all materials which are introduced into the device. These may be pulverulent materials, from which basic cores in the form of a granulate are produced, particularly in cooperation with a binder. In one use of the device, an enveloping layer consisting of the same or different starting materials can be built up on these basic cores or any other cores.

The "other" cores which may be coated are, for example, granulates, pellets, grains, seed grains, tablets, pills and the like. In this case, the cores may be homogeneous or an agglomerate or a core which has already been coated previously with one or more layers.

A coating is a layer which is built up or precipitated on a core in such a way that the core is surrounded essentially uniformly.

The coating may be composed of a material, a liquid or dispersion or of a mixture of a plurality of materials, for example of a conglomeration (snowball effect) of a pulverulent starting material and a liquid binder. The pulverulent starting material may, in this case, be a homogeneous material or mixture of a plurality of materials. It is often a neutral material which serves merely, in conglomeration with the liquid binder, for enveloping the core and at the same time giving the product as uniform a shape as possible with the same dimensions. Both the pulverulent starting material and the binder may also contain active substances intended for the envisaged use.

In order to simplify the remaining description of the invention, both the basic cores and the "other" independent cores are designated below, in general, only as cores, and starting materials are to be understood accordingly as the starting materials which are introduced into the device in order to form the basic cores or to apply an enveloping layer to existing cores.

An important aspect of the invention is that the starting materials, in particular the cores used, and ultimately the finished pourable product itself are put into a specific circulating movement by the rotor.

The starting materials or the cores are put by the rotor into a radially tangential direction of movement which is changed to a vertically tangential direction in the outer region of the rotor and in the vicinity of the wall of the rotor chamber.

Consequently, the cores leave the active region of the rotor with a kinetic energy which is sufficient for the cores to roll along on the guide vanes arranged statically on the rotor chamber and, at the same time, to change their direction of movement positively according to the shape of the guide vanes and essentially be deflected and fall back into the rotor.

The radially tangential direction of movement of the cores is inclined upward, at least in the radially outer third of the rotor, at an angle of between 10° and 80° to the axis of rotation, until the cores on the wall of the rotor chamber leave the rotor upward in a vertically tangential direction with kinetic energy. The inclination, which is advantageous in practice, is determined in each case by the mass of the cores or of the pourable products in conjunction with the diameter of the rotor and the rotational speed of the latter.

The cores are put, as a whole, into specific intensive, essentially concussion-free circulation, in which the cores and, in particular, the enveloping layers growing on the cores are not exposed to any adverse compressive and concussive loads.

According to the invention, the guide vanes are arranged statically on the inner wall of the rotor chamber above the plane of the upper edge of the rotor. In cross section relative to the rotor axis, they have essentially the shape of a segment of a circle or of a spiral. The outer ends of the segments emerge from the circle of the inner wall of the rotor chamber in the direction of rotation of the rotor, the tangents of the inner wall and of the guide vanes at the contact point having essentially the same inclination. The inner ends of the segments lie approximately in the middle part of the rotor radius.

By virtue of this specific configuration, the circulating product, in particular with delicate enveloping layers, can roll on the rotor, essentially free of concussion, under the influence of the kinetic energy, leave said rotor and roll on the inside of the guide vanes until it falls back into the rotor.

The cores do not, in particular, impinge onto angular fittings, for example on circulation obstacles, such as are used according to the prior art.

The cores roll intensively and uniformly on the guide vanes and against one another, so that they are exposed essentially on all sides to identical compressive loads and a uniform coating is formed.

Where thicker enveloping layers are used as a coating, it may also be advantageous to vary the guide vanes specifically as a function of the rollability of the cores, so that the cores are put into advantageous circulation according to their mass and size. For example, the vertical surfaces of the guide vanes may be arranged at least partially so as to be inclined to the perpendicular.

In one embodiment, the shape of the circular or spiral segments of the guide vanes may also be varied by an adjusting means. For this purpose, the guide vanes may be multiply divided. In the case of adjustment, individual or all parts of the guide vanes are then varied relative to one another in such a way that a different overall shape of the circular or spiral segments is formed.

By means of a device of this kind, in the event of a variation in the mass, the rolling movement of the coated cores or products can be optimized in a highly advantageous way.

At the beginning of the production of basic cores or a coating, the individual elements of the starting materials have substantially lower masses than at the end of the production of a pourable product. The specific rolling conditions therefore also change. By a change in the geometry of the guide vanes, also in conjunction with a change in the rotational speed of the rotor, an optimum rolling movement can be brought about in a highly advantageous way. A device with such a design may also advantageously be used as a universal plant for the selective production of widely varying pourable products.

The feed of different starting materials, for example of a pulverulent starting material and/or a liquid binder, to the circulating cores is carried out, basically, in a coordinated regime. The starting materials are metered in such a way that, immediately after the feed, they build up directly as an enveloping layer on the cores. The liquid binder moistens the cores or the surface of the partly coated cores and the pulverulent starting material then adheres to this moist surface. This ensures that no agglomerates of the starting materials for the enveloping layer can be formed without a core.

If basic cores are to be produced, generally in a first step, the management of the method depends greatly on the starting material. On the one hand, it may be possible for the starting material to be granulated or pilled solely as a result of the rolling movement. As a rule, however, a negligible quantity of binder, for example water, is added to a powder, so that the basic cores form around the drops of the binder. As a result, further starting material can then be applied to the basic cores in the manner of a coating.

If it is advantageous, in terms of the method, to dry the pourable product during and/or after coating, sheet-like gas passages in the form of perforations or screens may be arranged at least partially in the cone shell. A dry gas can be led from below through the gas passages via suitable feed devices.

The dry gas consequently flows around the cores very effectively and virtually at every point. The type of dry gas, its flow velocity and its temperature are influenced critically by the specific conditions of the respective products.

In principle, the device according to the invention is designed as a batch-fed plant, since the production of the pourable products requires the effect of the specific circulation for a certain amount of time. It is also possible, however, to operate the device as an interval flow plant. That is to say, the starting materials or the cores and the starting materials for building up the enveloping layer on them are fed to the rotor chamber at intervals and, after an appropriate process duration, are discharged from the latter again.

A solution which has proved appropriate for discharging the product from the device is one in which at least one flap is located in the wall of the rotor chamber above the rotor and preferably within a guide vane, said flap being suitable for moving the products out of the rotor chamber by means of the centrifugal forces when the flap is in the open position and when the rotor is rotating.

It is also possible, for example, for the finished product to be sucked away by means of a suction tube introduced into the rotor chamber from above.

The advantage of the invention is, in particular, that pourable products of widely varying kinds can be produced highly effectively, undried or dried, in a simple and careful way.

The production of the pourable products, with regard to both production of simple granulates and to the build up of complicated and delicate enveloping layers, by means of the device according to the invention leads to a product with a surprisingly uniform external shape. Depending on the shape of the cores and on the selected thickness of the enveloping layer, the products have a spherical shape or a shape diverging from this. If, for example, elongate cores are coated, then the product becomes spherical only when a relatively thick enveloping layer is applied. If this is not desirable, then, with a smaller thickness of the enveloping layer, the product will also still have an elongate shape.

It is particularly advantageous that any pronounced concussive or compressive load on the individual product particles is avoided when the device according to the invention is used. Consequently, where partly coated cores are concerned, there is also no coating material knocked off in a way which is usually highly disadvantageous. Such destructions of partly coated cores occur in the prior art, for example, due to the fact that the guide devices engage with their edges into the circulating material. The knocked-off coating materials may therefore form a separate granulate without a core. Such a granulate is harmful or disadvantageous when the core has a particular function, for example as a seed grain. During sowing, a defect occurs, entailing a corresponding crop loss.

The invention will be explained in more detail below with reference to two exemplary embodiments.

DESCRIPTION OF PREFERRED EMBODIMENTS

In one exemplary embodiment of the invention, seed grains of relatively different size and different shape are to be coated with an enveloping layer. The seed grains, designated in the example as cores, may also be, in an equivalent way, materials from the chemical industry, the food or fodder industry, agricultural technology, pharmacy or such like branches of industry.

The requirements which the coating must meet are determined essentially by the fact that the coated cores, as the product, are subsequently to be transported, treated or packaged individually. The problem is that, in modern industry, high-performance machines are used for this purpose, which work at high speed, thus, in turn, necessitating a high uniformity of the products to be processed or transported.

So that the packaging machines can fulfil this task, all the individual product elements must have the same spherical outer geometry, otherwise it may happen that the individual product, the core provided with an enveloping layer, jams in the machine, with the result that faults may be caused.

Figure 1:
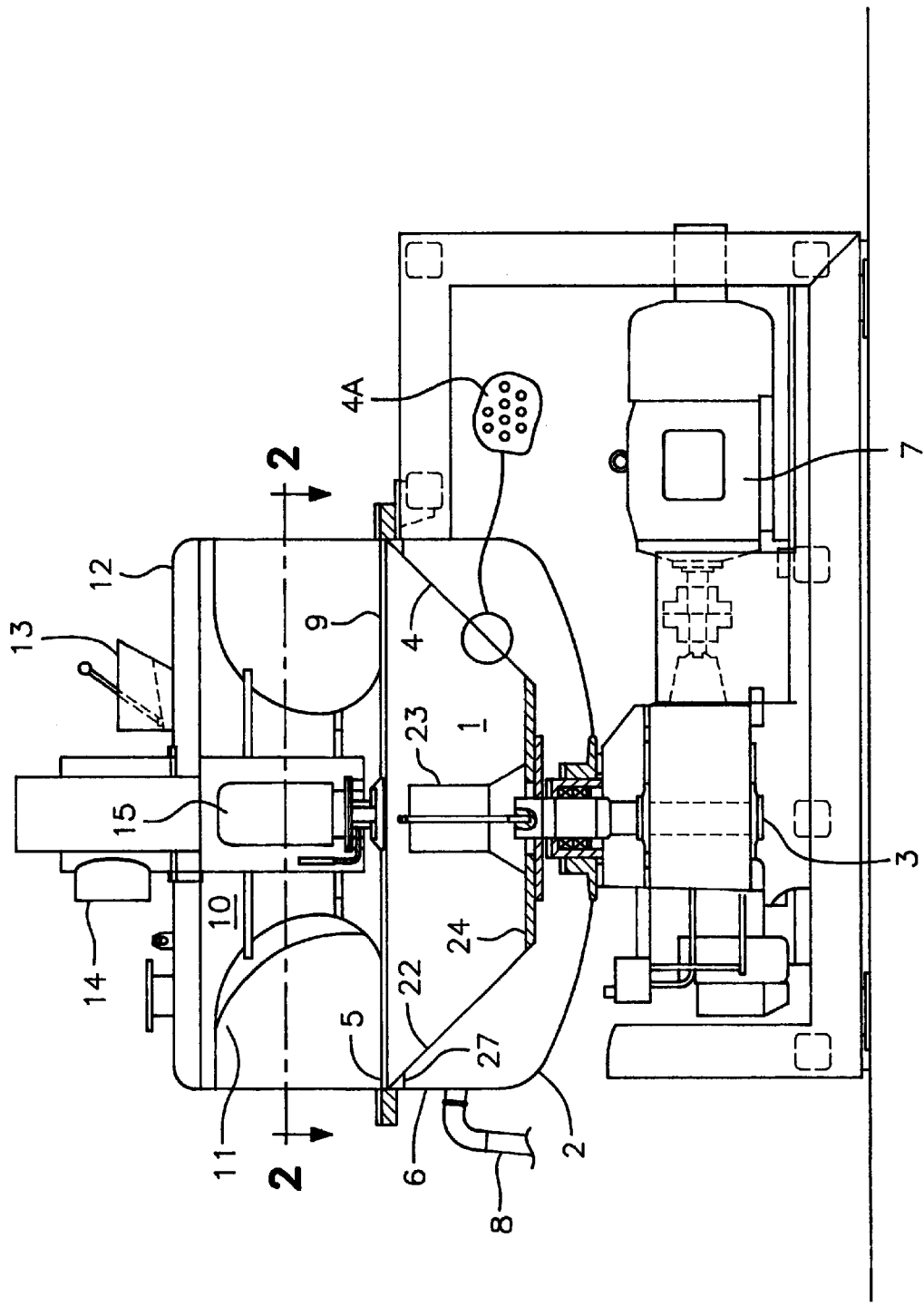
FIG. 1 shows a device according to the invention in a diagrammatic sectional illustration.

FIG. 1 shows the device according to the invention in section. The device consists of a rotor chamber 1 with a lower housing 2, in which a partly conically designed rotor 4 is arranged centrally in a vertical rotor axis 3.

The central part of the rotor 4 is covered by a central rotor sleeve 23. The radially adjoining portion 24 is designed horizontally. A cone shell 22 with an angle of inclination of 50° relative to the rotor axis 3 starts approximately in the middle of the radius.

The upper edge 5 of the rotor 4 reaches close to the inner wall 6 of the lower housing 2, so that an annular gap is formed. In the example, the rotor 4 is designed to be vertically adjustable and a short cone 27 is present on the wall 6 coaxially to the rotor axis 3. It is therefore possible to vary the annular gap and consequently the passage width for a dry gas between the rotor 4 and wall 6. Below the rotor 4, in the lower housing 2, there are two gas inlets 8, via which a gas or, specifically, a dry gas can be admitted into the rotor chamber 1. An electromotive drive 7 for the rotor 4 is located below the lower housing 2.

Figure 2:
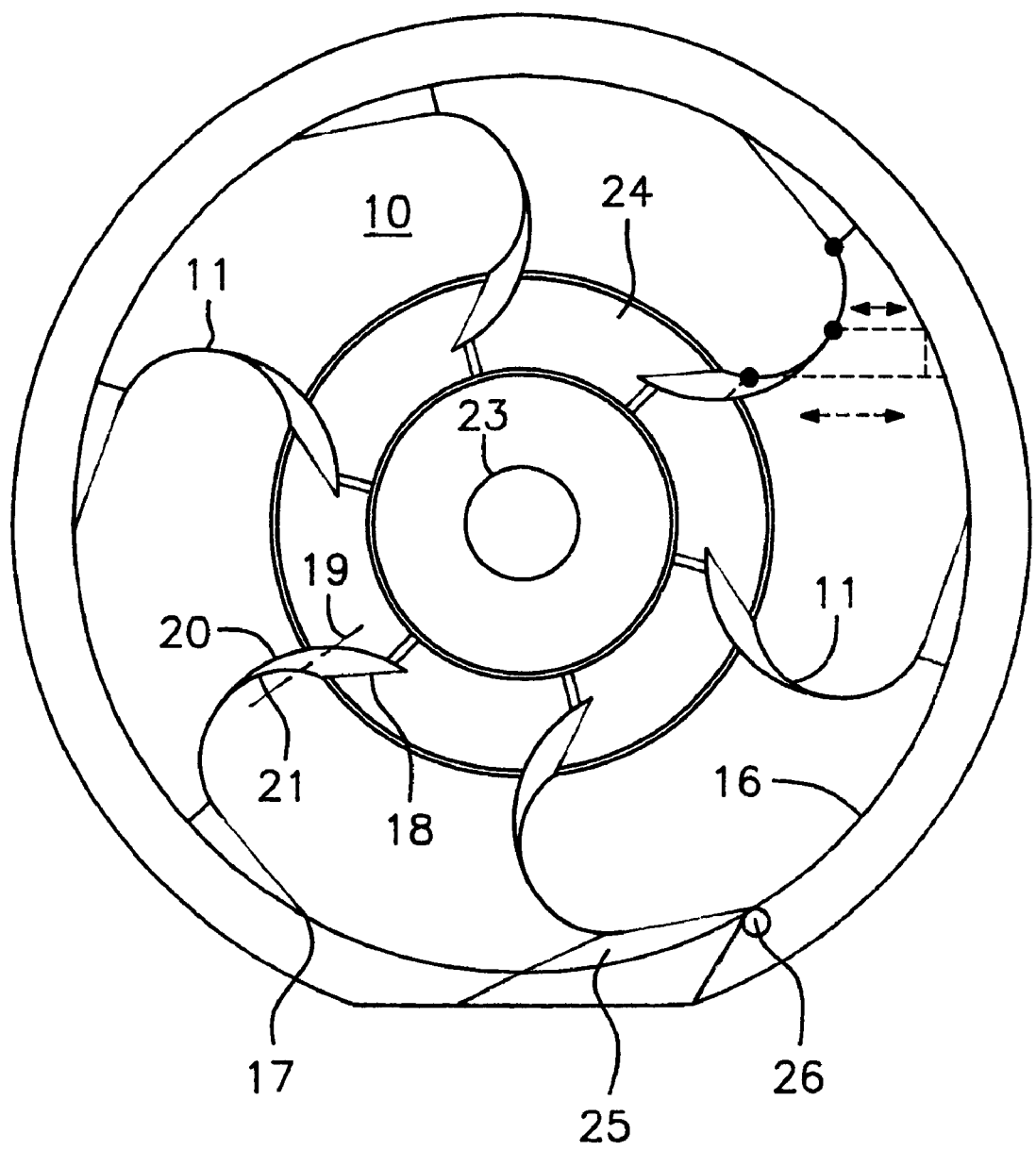
FIG. 2 shows a horizontal section above the guide vanes 11 according to FIG. 1.

The upper edge 5 of the rotor 4 and the upper edge of the lower housing 2 lie essentially in one plane 9. Above this plane 9 is arranged a guide vane ring 10, as illustrated in more detail in FIG. 2 in the top view (section above the guide vanes according to FIG. 1). For the sake of greater clarity, only two guide vanes 11 are indicated in FIG. 1.

Above the guide vane ring 10 is located the upper housing 12, which closes off the rotor chamber 1 upwardly. Located in the upper housing 12 are a feed orifice 13 for the cores to be coated, a feed 14 for a dry starting material and a central feed 15 for a liquid binder.

In the example (FIG. 2), the guide vane ring 10 having a diameter of approximately 1500 mm, six guide vanes 11 are arranged. The guide vanes 11 have about the height of the guide vane ring 10, the outer edge 17 being integrally formed, free of steps and edges, onto the inner wall 16 of the guide vane ring 10, that is to say, in practical execution, being welded on and ground down.

In the example, the guide vanes 11 are in the shape of a segment of a spiral, the outer edge 17 being the far-polar point and the inner edge 18 the near-polar point of the segment of the spiral. In this case, the integral forming of the spiral onto the inner wall 6 satisfies essentially the theoretical requirement that the outer ends of the guide vanes 11 emerge from the circle of the inner wall 6 of the rotor chamber 1 in the direction of rotation of the rotor 4 in such a way that the tangents of the inner wall 6 and of the guide vanes 11 at the contact point have essentially the same inclination.

The inner ends of the guide vanes 11, the edges 18, are located approximately in the middle part of the rotor radius.

It has proved to be advantageous if the vertical line 19 has, approximately in the middle of the guide vanes 11, a slight oblique position relative to the perpendicular, in such a way that the lower edge 20 of the guide vanes 11 is shaped further out than the upper edge 21 in the direction of rotation of the rotor 4.

For the purpose of discharging the finished product from the rotor chamber 1, a discharge orifice is located in a guide vane 11 and, in the coating phase of the method, is closed, without edges and gaps, by means of a flap 25. The flap 25 can be pivoted about the center of rotation 26, with the result that the discharge orifice is opened.

As already mentioned, seed grains are to be coated uniformly with an enveloping layer, so that a pourable product with a uniform spherical external shape is formed. The enveloping layer is composed of a pulverulent starting material and a liquid binder.

In the exemplary embodiment, the introduction of the cores to be coated into the rotor chamber 1 takes place batchwise via the feed orifice 13 while the rotor 4 is running. Immediately after the cores have impinged on the rotor 4, they are put into a radially tangential direction of movement and, by the cone shell 22 in the outer rotor portion, increasingly into a vertically tangential direction of movement.

The starting materials for building up the enveloping layer are subsequently fed to the cores slowly and in parallel via the feeds 14 and 15 into the rotor chamber 1. At the same time, in the exemplary embodiment, pulverulent cellulose is introduced via the feed 14 and liquid methyl cellulose is introduced via the central feed 15, as binders. The feed 14 has a shovel-like design, with the result that the pulverulent cellulose is applied linearly, above the rotor 4, to the circulating cores.

The central feed 15 has a centrally rotating centrifugal disk which distributes the methyl cellulose used as a binder to the cores in an annular manner. The practical impingement surface can be increased substantially by a variation in the rotational speed of the centrifugal disk, for example sinusoidal change in rotational speed.

Below the rotor 4, even before the cores are introduced, a dry gas is introduced via the two gas inlets 8, its function being, in particular, to keep the annular gap between the upper edge 5 and the rotor 4 and the inner wall 6 of the lower housing 2 free of enveloping material, in that a constant air stream flows via this gap into the space above the rotor 4. Furthermore, this gas stream also leads in a known way to a relatively low degree of drying the product.

In a design variant, the cone shell 22 is manufactured from perforated metal sheet and, with the exception of edge regions, has a uniform perforation with a diameter of 1 mm, shown schematically as 4A. As a result, the dry gas can flow not only through the annular gap between the rotor 4 and the inner wall 6, but also, in an appreciably larger part, through the circulating product via the perforation in the cone shell 22 of the rotor 4. In this case, particularly effective drying is achieved while the product is being produced, for example for drying on the enveloping material or, after the end of the production of the product, for final drying.

The central rotor sleeve 23 and the radially adjoining horizontal portion 24 of the rotor 4 ensure that the centrifugal force is always higher at every point on the rotor than the forces of adhesion of the starting materials or already partly coated cores to one another and to the rotor 4. If the rotor sleeve 23 is absent, the rotational force at the center of the rotor 4 may theoretically have the value zero and partly coated cores may be caked together.

The rotational speed of the rotor 4 is selected in such a way that the cores are moved by the kinetic energy beyond the upper edge 5 of the rotor 4 into the guide vane ring 10. The cores or the partly coated cores in this case pass into the active region of the guide vanes 11 and consequently roll along on the inner surface of the guide vanes 11 in an impact-free and concussion-free manner, the vertically tangential direction of movement of the cores during entry into the active region of the guide vanes 11 being essentially deflected and at the same time having a central direction superposed on it. After leaving the guide vanes 11, the cores fall into the rotor 4 again and come once more under the influence of the rotor 4, and the cycle recommences.

Managing the method in way according to the invention in the specific device according to the invention results in extremely uniform intensive circulation of the cores. The cores roll on the device, but also among one another, and a dense and uniform enveloping layer is built up, the outer dimensions of all the product elements having the same size. Contrary to the solutions according to the prior art, in the entire circulation process the cores do not come into concussive or impact contact with any surfaces or edges of fittings.

The movement of the cores varies very greatly, of course, depending on whether the cores are circulated in the lower region of the guide vanes or to a greater extent in the upper region. However, the fundamental movement sequence always remains the same.

In the intensive circulation described, during which each individual core or partly coated core rolls on the parts of the device and on the adjacent partly coated cores, each individual core executes a specific movement such that, on the principle of least volume with maximum mass, all the product elements have the same outer dimensions. Thicker coatings on the cores are ground down again and enveloping material is built up further on smaller partly coated cores.

After the technologically required parameters have been achieved, the feed of the starting materials is terminated. The circulation process can be pursued further under the effect of the dry gas, until the enveloping layer has the necessary degree of dryness.

In another exemplary embodiment of the invention, a sugar granulate in the form of spheres with a mean diameter of 0.5 mm is to be produced from powdered sugar. A sugar granulate of this kind is required in the pharmaceutical industry in many ways as a core for specific preparations, to which, for example, liquid active substances are applied as enveloping layers.

The device described according to the first exemplary embodiment is likewise used for producing the sugar granulate. Powdered sugar is introduced into the rotor 4 through the feed 14 in an extremely simple way. Finely atomized water is sprayed in parallel or subsequently onto the circulating powdered sugar via the central feed 15. The fine water drops are surrounded immediately by the powdered sugar and a basic core is formed. The size of the basic cores can be influenced by the rotational speed and geometry of the guide vanes and by the quantity and size of the drops of fed water. The basic cores which, in the example, are predetermined and have a diameter of 0.5 mm are produced in a very short time. Consequently, depending on the technological circumstances, the desired pourable product is produced or, immediately thereafter, an enveloping layer containing specific active substances is also built up onto the basic core of sugar granulate. The device and the method may also be varied within a relatively wide range, using the solutions as claimed in the respective subclaims, and, in particular, the enveloping layer can be adapted to technologically functional requirements.

The invention may also be used, in a similar way to the exemplary embodiment, in a more comprehensive way for building up a plurality of different layers of the same or a different type. The type of cores and the type and structure of the enveloping layer may be varied within wide ranges. For example, tablets may be coated with a plurality of functional enveloping layers for different purposes and aims. It is also possible to produce necessary cores first as granulates and then to provide these with a coating. In conclusion, the product may finally be dried in the same device.

What is claimed is:

1. A device for producing a pourable product, comprising a rotor chamber (1) having an axially extending cylindrical wall (6), a rotor (4) defining a vertical rotor axis (3) mounted within said rotor chamber, said rotor (4) having a central horizontal surface and, at least in its radially outer third, the shape of a conical shell (22) with an outward and upward inclination on the rotor axis (3) of between 10° and 80°, said conical shell having an upper edge (5) of circular shape and lying in a plane (9) perpendicular to the rotor axis, feeds (13, 14, 15) for introducing starting materials for the pourable product, a plurality of guide vanes (11) for circulating the starting materials or the product, said guide vanes (11) being affixed statically on said wall (6) within said rotor chamber (1) and located above the plane (9) of the upper edge (5) of the conical shell of the rotor (4) and having, in cross section to the rotor axis (3), essentially the shape of a segment of a circle or spiral, the outer ends of said guide vanes emerge tangentially from the cylindrical wall (6) of the rotor (4); and the inner ends of said guide vanes lie approximately midway of the rotor radius such that circulating product, which leaves the rotor (4) under the influence of kinetic energy, rolls on an inside surface of said guide vane (11) and falls back into the rotor (4).

2. The device as claimed in claim 1, wherein each of the plurality of guide vanes are of multipart design and include adjusting means for adjusting the shape of the segments of the circle or spiral.

3. The device as claimed in claim 1, wherein the guide vanes (11) include surfaces at least partially inclined with respect to the rotor axis.

4. The device as claimed in claim 1, wherein said conical shell (22) includes perforations or screens to which a dry gas can be led from below.

5. The device as claimed in claim 1, wherein at least one of said conical shell (22) and rotor (4) are or is arranged to be exchangeable with a conical shell or rotor of different shape.

6. The device as claimed in claim 1, wherein the feeds for the starting materials for the pourable product are above the rotor (4) in the rotor chamber (1), and include at least one of a feed (14) for a pulverulent starting material and a feed (15) for a liquid binder.

7. The device as claimed in claim 6, wherein the feeds (14, 15) for the pulverulent starting material and/or the binder are configured in such a way that the materials are introduced into the rotor chamber (1) in a sheet-like manner.

8. The device as claimed in claim 1, wherein the rotor (4) and the rotor chamber (1) form an annular gap relative to one another, wherein the rotor (4) is mounted axially displaceably within the rotor chamber (1), and wherein a cone (27) is present on the rotor chamber (1) in the region of the upper edge (5) of the rotor (4), in such a way that, in the event of a vertical displacement of the rotor (4), the passage width of the annular gap can be varied.

9. The device as claimed in claim 1, wherein at least one of said guide vanes (11), adjacent the wall (6) of the rotor chamber (1), includes a closeable orifice, through which the products are moved out of the rotor chamber (1) by means of the centrifugal forces when said orifice is in the open position and said rotor (4) is rotating.

10. A method for using a device as claimed in claim 1, comprising introducing at least one pulverulent starting material into said device, adding a binder, and rotating the rotor to form a pourable product in the form of basic cores.

11. A method for using a device as claimed in claim 1, comprising introducing cores into said device and, subsequently or in parallel, introducing further pulverulent and/or liquid and/or suspension-like starting materials to the cores for forming an enveloping layer.

12. The method of claim 11, wherein said introducing of pulverulent and/or liquid starting materials is at predetermined rates such that a coating builds up as a pasty layer, and rotating the rotor (4) such that the cores or pourable products roll essentially freely with respect to the device components and with respect to one another such that no deformation of the enveloping layer occurs.

13. The method as claimed in claim 12, wherein a plurality of different layers having different starting materials and/or binders are built up in succession.

14. The method for using a device as claimed in claim 1, including perforations or screens in the conical shell and admitting a drying gas through the perforations or screens in the conical shell (22) of the rotor (4) during or after the production of a pourable product.

15. The method for using a device as claimed in claim 1, comprising rotating the rotor at a sufficient speed such that the centrifugal force imparted to the starting materials or pourable product is always set higher than the forces of adhesion of the starting materials or product particles to one another and to the rotor (4).

* * * * *